United States Patent [19]

Homma et al.

[11] Patent Number: 5,937,216

[45] Date of Patent: *Aug. 10, 1999

[54] FOCAL ADJUSTMENT APPARATUS FOR A CAMERA

[75] Inventors: Itaru Homma, Kawasaki; Yosuke Kusaka; Toru Iwane, both of Yokohama, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/823,128

[22] Filed: Mar. 25, 1997

Related U.S. Application Data

[60] Provisional application No. 60/038,203, Feb. 18, 1997.

[30] Foreign Application Priority Data

May 24, 1996 [JP] Japan ................................ 8-130216

[51] Int. Cl.⁶ .................................................. G03B 3/10
[52] U.S. Cl. .................................................... 396/95
[58] Field of Search ............................................. 396/95

[56] References Cited

U.S. PATENT DOCUMENTS

| | | | |
|---|---|---|---|
| 5,291,300 | 3/1994 | Ueda | 396/95 |
| 5,341,169 | 8/1994 | Kaneda et al. | 396/95 |
| 5,555,068 | 9/1996 | Utagawa | 396/95 |

FOREIGN PATENT DOCUMENTS

| | | |
|---|---|---|
| A-1-288816 | 11/1989 | Japan. |
| A-5-45576 | 2/1993 | Japan. |

*Primary Examiner*—Russell Adams
*Attorney, Agent, or Firm*—Oliff & Berridge, PLC

[57] ABSTRACT

A focus adjustment apparatus is provided that tracks the direction of movement of an object from a plurality of focus detection areas disposed within the photographic screen of a camera in an efficient order. The focus adjustment apparatus includes a focus detection device that individually detects focus detection information of a plurality of focus detection areas; a memory that records a selection order of focus detection areas used in focus control; a focus estimation device that extends a trend of the focus detection information and calculates estimated values of the focus detection information regarding the focus detection areas used in the focus control; a tracking device that tracks the focus detection areas matching the estimated values computed by the focus estimation device by following the selection order during the past focus control operation recorded by the memory; and a focus controller that performs focus control regarding the focus detection areas tracked by the tracking device.

18 Claims, 13 Drawing Sheets

Fig. 11(A)

| FOCAL DETECTION AREA | OCCURRENCE FREQUENCY |
|---|---|
| a | 15 |
| b | 2 |
| c | 12 |
| d | 10 |
| e | 3 |

Fig. 11(B)

| FOCAL DETECTION AREA | OCCURRENCE FREQUENCY |
|---|---|
| a | 2 |
| b | 3 |
| c | 12 |
| d | 15 |
| e | 10 |

Fig. 13

| TRANSITION SOURCE \ TRANSITION SOURCE | a | b | c | d | e |
|---|---|---|---|---|---|
| a |  | 10 | 20 | 15 | 1 |
| b | 9 |  | 10 | 2 | 15 |
| c | 8 | 7 |  | 15 | 9 |
| d | 2 | 1 | 10 |  | 5 |
| e | 1 | 10 | 15 | 8 |  |

FOCAL ADJUSTMENT APPARATUS FOR A CAMERA

This non-provisional application claims the benefit of U.S. Provisional Application No. 60/038,203, filed Feb. 18, 1997, entitled "Autofocusing Device of a Camera" by Itaru Homma, Yosuke Kusaka and Touru Iwane (Attorney Docket No. JAO 32383).

BACKGROUND OF THE INVENTION

1. Field of the Invention

The invention concerns a or, focus adjustment apparatus that tracks the direction of movement of an object from a plurality of focus detection areas disposed within the photographic screen of a camera. More particularly, the invention relates to a focus adjustment apparatus that performs the tracking of focus detection areas in an efficient order.

2. Description of Related Art

In recent years conventional cameras automatically adjust the focus by following the object image moving on the photographic screen. Japanese Laid-Open Patent No. 1-288816, the subject matter of which is incorporated herein by reference, includes a focus adjustment apparatus that tracks the direction of movement of the object image from among a plurality of focus detection areas, and continuously executes focus control regarding the tracked focus areas.

The operation of this type of focus adjustment apparatus is summarized below.

First, the focus adjustment apparatus initializes as the area used for focus control (henceforth called "selected area") the focus detection area positioned in the center of the photographic screen. Next, the focus adjustment apparatus individually measures the defocusing amount, that is, the interval between the image plane of the object image and the imaging surface. Then, the image plane positions are sought for each focus detection area by adding to this defocusing amount the lens positions of the photographic lens.

The focus adjustment apparatus judges the continuity of the previous image plane position and the present image plane position with respect to a series of selected areas. When there is continuity in the image plane positions, the focus adjustment apparatus judges that the object image positioned within the selected areas is in continuous positions within the selected areas. Thus, the focus adjustment apparatus estimates the movement of the image plane position regarding the selected areas, and performs estimated control of the focus.

On the other hand, when there is no continuity in the image plane positions, the focus adjustment apparatus judges that the object image positioned within the selected areas has moved outside the selected areas. Thus, the focus adjustment apparatus reads in the latest image plane position from all the focus detection areas, seeks the difference with the present image plane position in the selected areas, and calculates the image plane velocity.

The calculated image plane velocity is the image plane velocity when it is presumed that the object image previously positioned in the selected areas has moved to other focus detection areas. The focus adjustment apparatus selects from among all of these image plane velocities the one nearest to the previous image plane velocity of the selected areas. Because the area selected in this manner can be judged as the direction of movement of the object image positioned within the selected areas, it is established as the selected area henceforth.

The focus adjustment apparatus continuously performs focus control regarding the selected areas modified in this manner. By repeating such operations, it is possible to continue the focus control while tracking the object image moving on the photographic screen and automatically switching the focus detection areas.

Japanese Laid-Open Patent No. 5-45576, the subject matter of which is incorporated herein by reference, discloses an apparatus that tracks the direction of movement of an object preferentially from the focus detection area, which completes the detection of the defocusing amount first. With such an apparatus, it is possible to begin quickly the tracking of the direction of movement of the object image without relying on the completion of the detection of all the defocusing amounts.

With the focus adjustment apparatus as disclosed in Japanese Laid-Open Patent No. 1-288816, the optimum area for focus control is selected from the defocusing amounts of all the focus detection areas. Therefore, it is not possible to specify the direction of movement of the object image, and the time needed for tracking is long.

With the apparatus as disclosed in Japanese Laid-Open Patent 5-45576, the direction of movement of the object image is tracked in the order of detection of the defocusing amount, without relying on the completion of the detection of all of the defocusing amounts. Nevertheless, the order of detection of the defocusing amount is an order depending on the luminance of the focus detection area. Thus, there is no correlation with the direction of movement of the object image. Therefore, while the tracking would begin quickly, it does not necessarily follow that the direction of movement would be found quickly. Also, because there is no correlation between the order of detection of the defocusing amount and the direction of movement of the object, the possibility of another body accidentally tracked being misidentified as the object is high, resulting in low reliability of the tracking.

SUMMARY OF THE INVENTION

In view of the foregoing problems of the conventional art, an object of the invention is to provide a focus adjustment apparatus that can track accurately in an efficient order the direction of movement of the object image.

A further object of the invention is to provide a focus adjustment apparatus that reduces the risk of the tracking time becoming long when it is difficult to specify the tracking order, and that tracks efficiently the direction of movement of the object.

An additional object of the invention is to provide a focus adjustment apparatus that can determine the tracking order accurately even when the orientation of the camera is changed.

The invention according to one embodiment includes a focus detector that individually detects focus detection information of a plurality of focus detection areas; a memory device that records a selection order of focus detection areas used in focus control; a focus estimation device that extends a trend of the focus detection information and calculates estimated values of the focus detection information regarding the focus detection areas used in the focus control; a tracking device that tracks the focus detection areas matching the estimated values computed by the focus estimation device following the selection order determined during a past focus control operation recorded in the memory device; and a focus controller that performs focus control regarding the focus detection areas tracked by the tracking device.

In this focus adjustment apparatus, the memory device may record the selection order of the focus detection areas.

The tracking device tracks the direction of movement of the object image following the past selection order.

Generally, when photographing automobiles and pedestrians moving on a road, the object image passes the same course in succession on the photographic screen. Regarding an object image consistently following a same or similar course of movement, the time required to determine the direction of movement is shortened effectively by tracking the direction of movement of the object image by following the past selection order in the above manner.

Consequently, regarding the first tracking operation, a tracking time identical to the conventional tracking time is required, but regarding the second and following tracking operations, it is possible to substantially shorten the tracking time. Also, by performing tracking preferentially beginning with the focus detection area having the highest probability, the probability of misidentifying as the object a body other than the object is reduced, and the reliability of the tracking results is increased.

The invention according to another embodiment includes a focus detector that individually detects focus detection information of a plurality of focus detection areas; a memory device that records frequencies of occurrence of focus detection areas used in focus control; a focus estimation device that extends a trend of the focus detection information and calculates the estimated values of the focus detection information regarding the focus detection areas used in the focus control; a tracking device that tracks the focus detection areas matching the estimated values computed by the focus estimation device following an order of the frequencies of occurrence recorded by the memory device; and a focus controller that performs focus control regarding the focus detection areas tracked by the tracking device.

With the focus adjustment apparatus according to this embodiment, the memory device may record the frequencies of occurrence (probabilities of occurrence) of the focus detection areas. The tracking device tracks the direction of movement of the object image following the past order of highest to lowest frequency of occurrence.

Generally, when macro-photographing flowers waving in the wind and when photographing children riding on swings, the object image periodically passes along the same course of movement on the photographic screen. With such an object image, the time on both ends of the single path is longest, and the frequency of occurrence of the focus detection areas corresponding to the ends is higher. Therefore, by tracking the direction of movement of the object image following the past order of frequencies of occurrence as above, the time required to determine the direction of movement is shortened effectively.

While the initial tracking may include a similar tracking time to the prior art, as time proceeds, it is possible to determine the frequencies of occurrence accurately, and to substantially shorten the tracking time. Also, by performing tracking preferentially beginning with the focus detection area having the highest probability, the probability of misidentifying as the object a body other than the object is reduced, and the reliability of the tracking results is substantially increased.

The invention according to yet another embodiment includes a focus detector that individually detects the focus detection information of a plurality of focus detection areas; a memory device that records frequencies of transition of focus detection areas used in focus control; a focus estimation device that extends a trend of the focus detection information and calculates estimated values of the focus detection information regarding the focus detection areas used in the focus control; a tracking device that tracks the focus detection areas matching the estimated values computed by the focus estimation device following an order of the frequencies of transition recorded by the memory device; and a focus controller that performs focus control regarding the focus detection areas tracked by the tracking device.

With the focus adjustment apparatus according to this embodiment, the memory may record the frequencies of moving from a present focus detection area to a next focus detection area (henceforth called "frequencies of transition"). The tracking device tracks the direction of movement of the object image following this past order of highest to lowest frequency of transition.

Generally, when photographing automobiles and pedestrians moving on a road, the object image passes the same course in succession on the photographic screen. Regarding an object image consistently following a same or similar course of movement, the time required to determine the direction of movement is shortened effectively by tracking the direction of movement of the object image by following the past order in the above manner.

While the initial tracking may include a similar tracking time to the prior art, as time proceeds, it is possible to determine the frequencies of transition accurately, and to substantially shorten the tracking time. Also, by performing tracking preferentially beginning with the focus detection area having the highest probability, the probability of misidentifying as the object a body other than the object is reduced, and the reliability of the tracking results is substantially increased.

The invention according to another embodiment includes a focus detector that individually detects focus detection information of a plurality of focus detection areas; a memory device that records an order of focus detection areas selected by a manual operation; a focus estimation device that extends a trend of the focus detection information and calculates estimated values of the focus detection information regarding the focus detection areas used in focus control; a tracking device that tracks the focus detection areas matching the estimated values computed by the focus estimation device following the order of settings recorded by the memory device; and a focus controller that performs focus control regarding the focus detection areas tracked by the tracking device.

With the focus adjustment apparatus according to this embodiment, the tracking device may track the direction of movement of the object image following the order of focus detection areas manually selected by the photographer.

Generally, when photographing automobiles and pedestrians moving on a road, the object image generally passes along a predictable course. Regarding object images for which the course of movement is predictable to a certain extent, it is possible to effectively shorten the time required for tracking by following the order manually set by the photographer. By performing tracking following the order selected by the photographer, the probability of erroneously identifying as the object a body other than the object is reduced, and the reliability of the tracking results is substantially increased.

The invention according to a still further embodiment includes a focus detector that individually detects focus detection information of a plurality of focus detection areas; a focus estimation device that extends a trend of the focus detection information and calculates estimated values of the focus detection information regarding the focus detection areas used in the focus control; a tracking device that tracks the focus detection areas matching the estimated values computed by the focus estimation device following a randomly selected tracking order; and a focus controller that performs focus control regarding the focus detection areas tracked by the tracking device.

With the focus adjustment apparatus according to this embodiment, the tracking device tracks the direction of movement of the object image in a random order.

Generally, when photographing children running around an open space and when photographing butterflies fluttering about, it is difficult to specify the course of movement of the object image. When the course of movement cannot be specified in this manner, the risk is high of the tracking time becoming unnecessarily long when the tracking order is indiscriminately set.

Thus, when changing randomly the tracking order each time as above, it is possible to reduce the risk of the tracking time becoming unnecessarily long. Consequently, when it is difficult to specify the tracking order, it is possible to track at an average speed the direction of movement of the object image.

Each embodiment having a memory device can further include a camera orientation detector that detects whether the camera is in a horizontal or a vertical orientation, wherein memory areas of the memory device are provided specifically for each of the camera orientations, and are switched according to the camera orientation detected by the camera orientation detector. Thus, whether the camera is horizontally or vertically oriented is detected by the camera orientation detector. The memory switches the dedicated memory area according to the camera orientation. There may be provided multiple memories for each camera orientation, and the memory areas of the memory may be partitioned for each camera position.

Generally, it is common that the courses of movement of the object image differ between the horizontal and the vertical orientation. Thus, by providing dedicated memory areas for each camera position, it is possible to make the historical results of the memory reflect correctly the changes of the course of movement due to the differences in camera orientation. Thus, it is possible to determine correctly the tracking order of the object image by adding the condition of the camera orientation.

Further, each embodiment having a memory device can further include a camera orientation detector that detects whether the camera is in a horizontal orientation or a vertical orientation, wherein the memory device rotates the orientation of the focus detection areas on the memory areas according to the camera orientation detected by the camera orientation detector. Thus, whether the camera is horizontally or vertically oriented is detected by the camera orientation detector. The memory device rotates the orientation of the focus detection areas on the memory areas according to the camera orientation.

Generally, it is common that the courses of movement of the object image are rotated to the extent of 90°. Thus, it is possible to absorb the changes in the courses of movement due to the camera orientation by rotating the memory contents of the memory device.

Consequently, regardless of the camera orientation, it is possible to correctly determine the tracking order of the object image. Also, because the history of the courses of movement are collected uniformly concerning the horizontal and vertical orientations, the sample size recorded in the memory becomes greater. Consequently, it is possible to determine more correctly the tracking order of the object image.

BRIEF DESCRIPTION OF THE DRAWINGS

These and other aspects and advantages of the invention will become apparent from the following detailed description of preferred embodiments when taken in conjunction with the accompanying drawings, in which:

FIGS. 11(A) and 11(B) are tables that show the adjustment of the memory areas following a change in camera orientation;

FIG. 13 is a table showing an example of the transition frequencies of the focus detection areas;

DETAILED DESCRIPTION OF PREFERRED EMBODIMENTS

Figure 1:
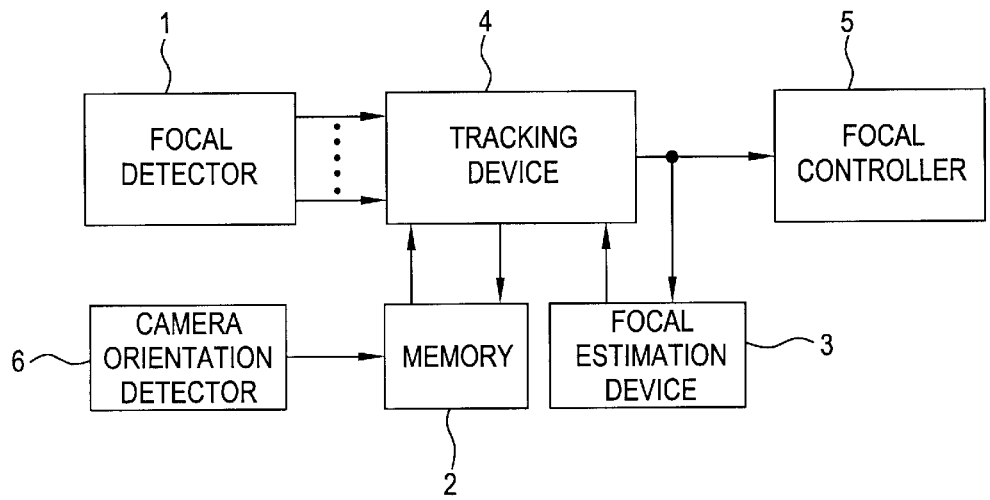
FIG. 1 is a block diagram of the present invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

Figure 2:
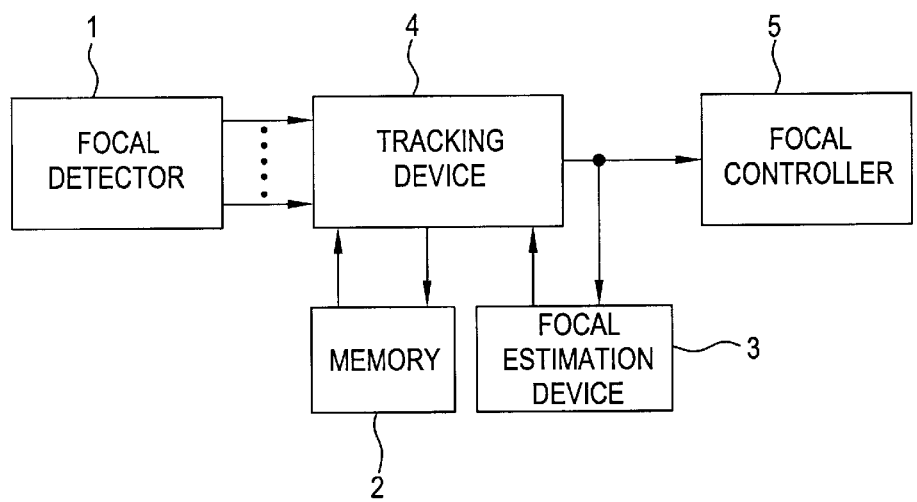
FIG. 2 is another block diagram of the invention;.
Figure 3:
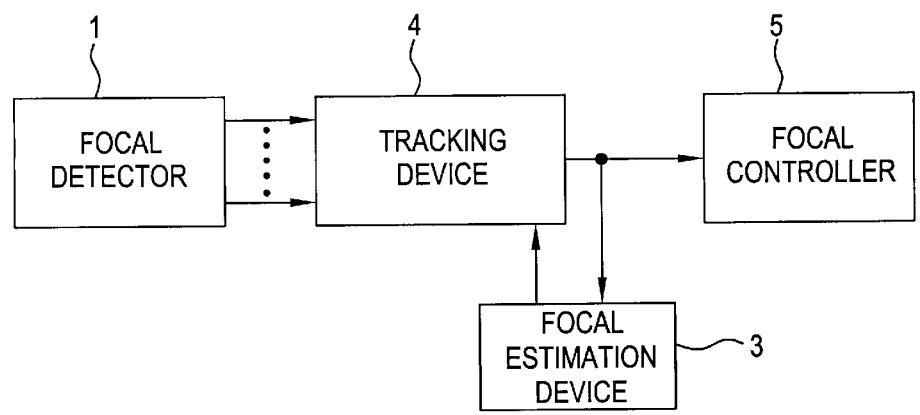
FIG. 3 is an additional block diagram of the invention.

FIG. 1 is a block diagram of the invention. FIG. 2 is another block diagram of the invention. FIG. 3 is an additionl block diagram of the invention.

Figure 4:
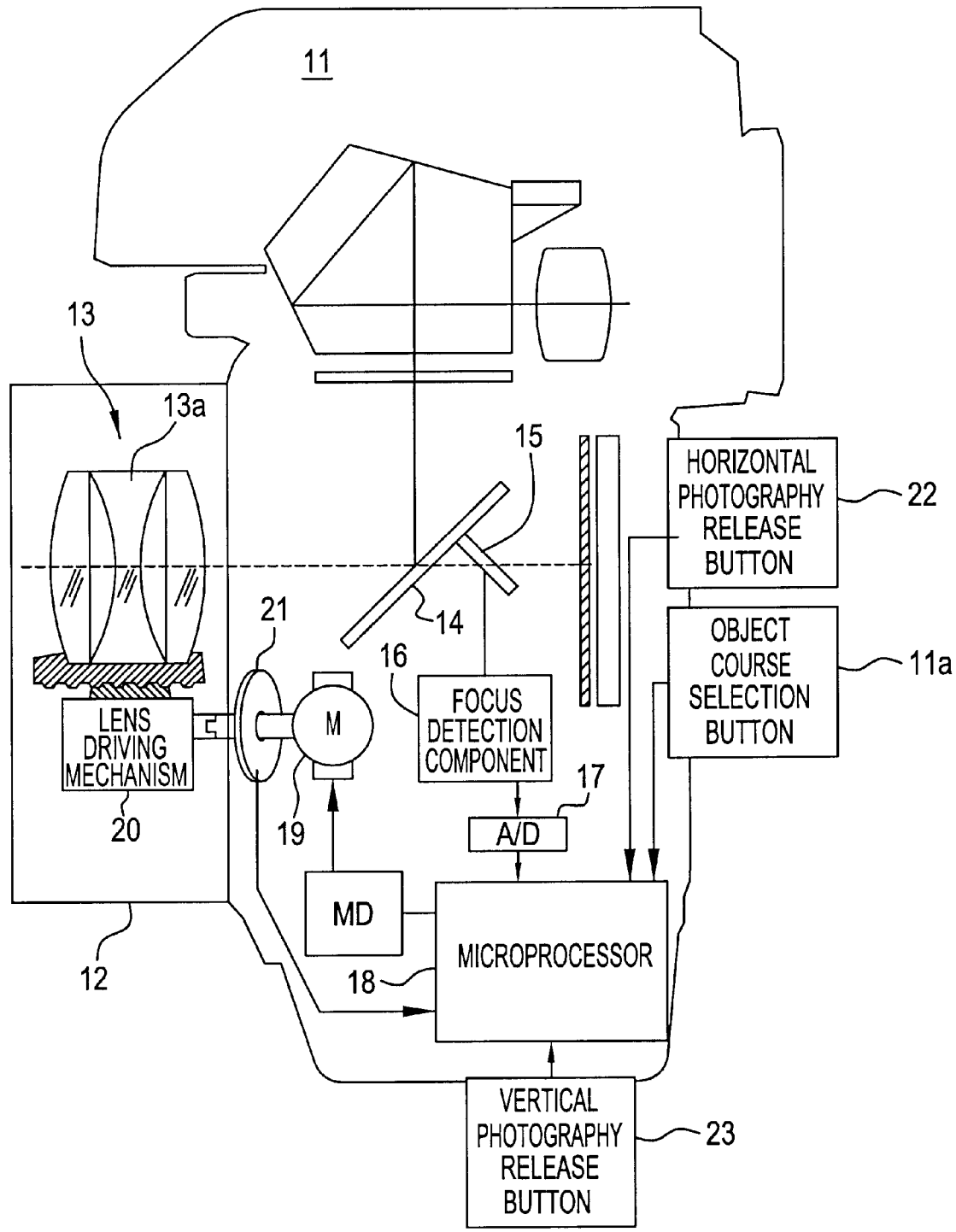
FIG. 4 shows the preferred structure of the invention.

FIG. 4 shows the structure of the invention. In FIG. 4, a lens barrel 12 is mounted on the front of the camera body 11. A photographic optical system 13 is positioned inside the lens barrel 12.

Along the optical axis of the photographic optical system 13 are placed in sequence a mirror 14 and a sub-mirror 15. A focus detection component 16 is placed below the sub-mirror 15 in a reflective direction. The image signal output from the focus detection component 16 is sent to a microprocessor 18 via an A/D converter 17.

The PWM (pulse width modulation) output of the microprocessor 18 is forwarded to a motor 19 via a drive circuit (MD), and the drive force of the motor 19 is provided to a lens drive mechanism 20 within the lens barrel 12. The lens drive mechanism 20 extends from a point in front of the focus adjustment lens group 13a to a point behind the focus adjustment lens group 13a of the photographic optical system 13 (left to right in FIG. 4).

An encoder 21 is attached to the drive shaft of the motor 19. The pulse output of the encoder 21 is connected to the microprocessor 18. A horizontal photography release button 22, a vertical photography release button 23, and an object course selection button 11a are also connected to the microprocessor 18.

Figure 5:
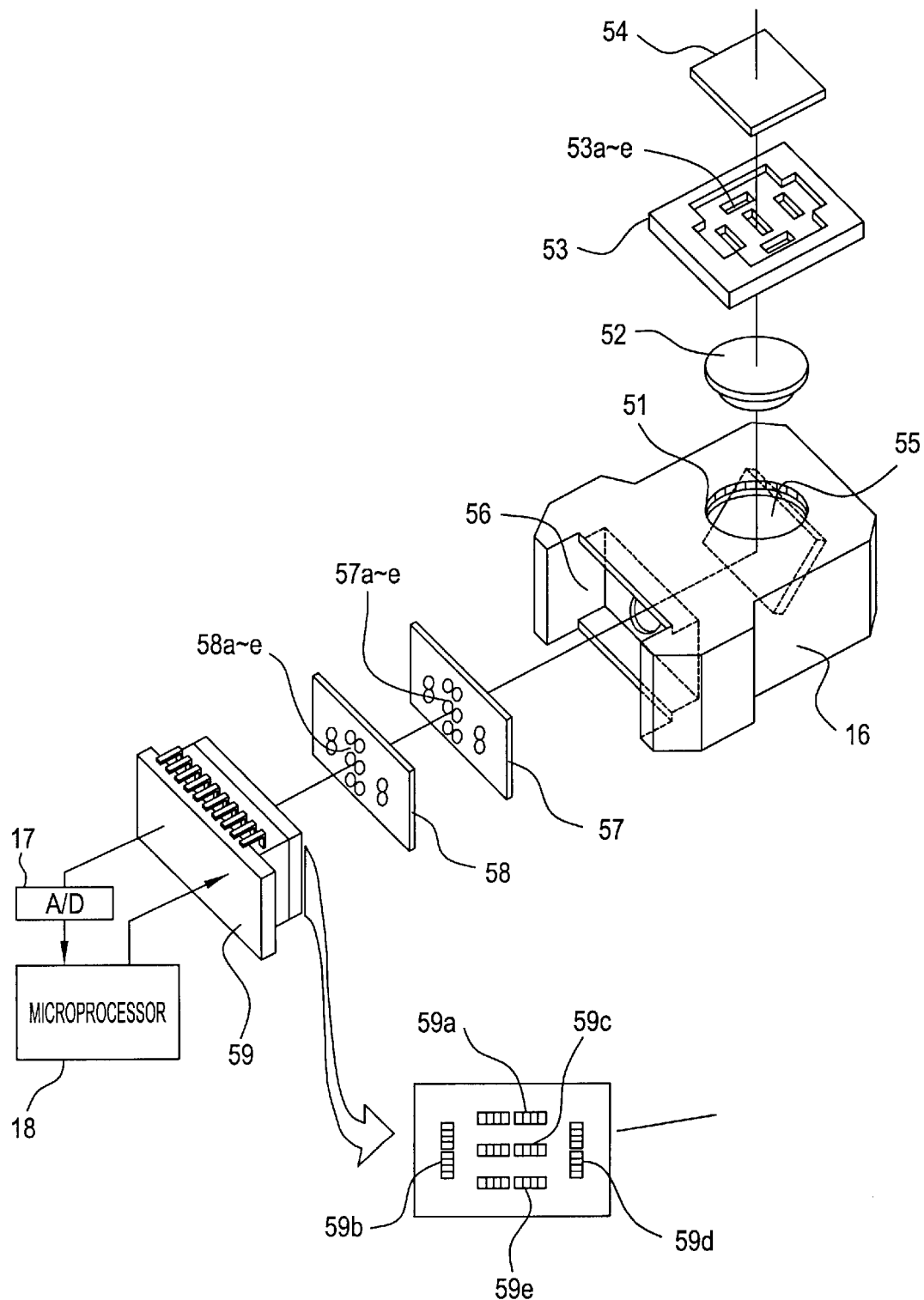
FIG. 5 is an exploded perspective view of the internal structure of the focus detection component of the invention.

FIG. 5 is an exploded perspective view of the internal structure of the focus detection component 16. In FIG. 5, a lens holder 51 is provided on top of the focus detection component 16. A condenser lens 52 is inserted into the lens holder 51. A light-blocking plate 53 is placed on top of the condenser lens 52. On the light-blocking plate 53 field masks 53a–e are provided which match the positions of the focus detection areas. An infrared cut filter 54 that blocks infrared light is placed on top of this light-blocking plate 53.

A mirror 55 is placed directly below the condenser lens 52. Along the reflective axis of the mirror 55 are placed in sequence a charge couple device 56, a diaphragm plate 57, a lens plate 58, and an image sensor 59. The output of the image sensor 59 is connected to the microprocessor 18 via the A/D converter 17. The diaphragm plate 57 includes diaphragm masks 57a–e constituted by pairs of openings matching the positions of the focus detection areas. The lens plate 58 has separator lenses 58a–e constituted by pairs of image-forming lenses matching the positions of the focus detection areas integrally formed therein. Also, light-receivers 59a–e constituted by pairs of light-receiving element arrays matching the positions of the focus detection areas are formed on the light-receiving plane of the image sensor 59.

Regarding the first embodiment represented in the block diagram of FIG. 1, generally, the focus detector 1 corresponds to the focus detection component 16; the memory device 2 corresponds to the "selection order function" of the microprocessor 18; the focus estimation device 3 corresponds to the "image plane position estimation function" of the microprocessor 18; the tracking device 4 corresponds to the "object movement direction tracking function" of the microprocessor 18; and the focus controller 5 corresponds to the lens drive mechanism 20, the encoder 21, and the "focus control function" of the microprocessor 18. Further, generally, the camera orientation detector 6 corresponds to the horizontal photography release button 22, the vertical position release button 23, and the "camera position determination function" of the microprocessor 18.

Figure 6:
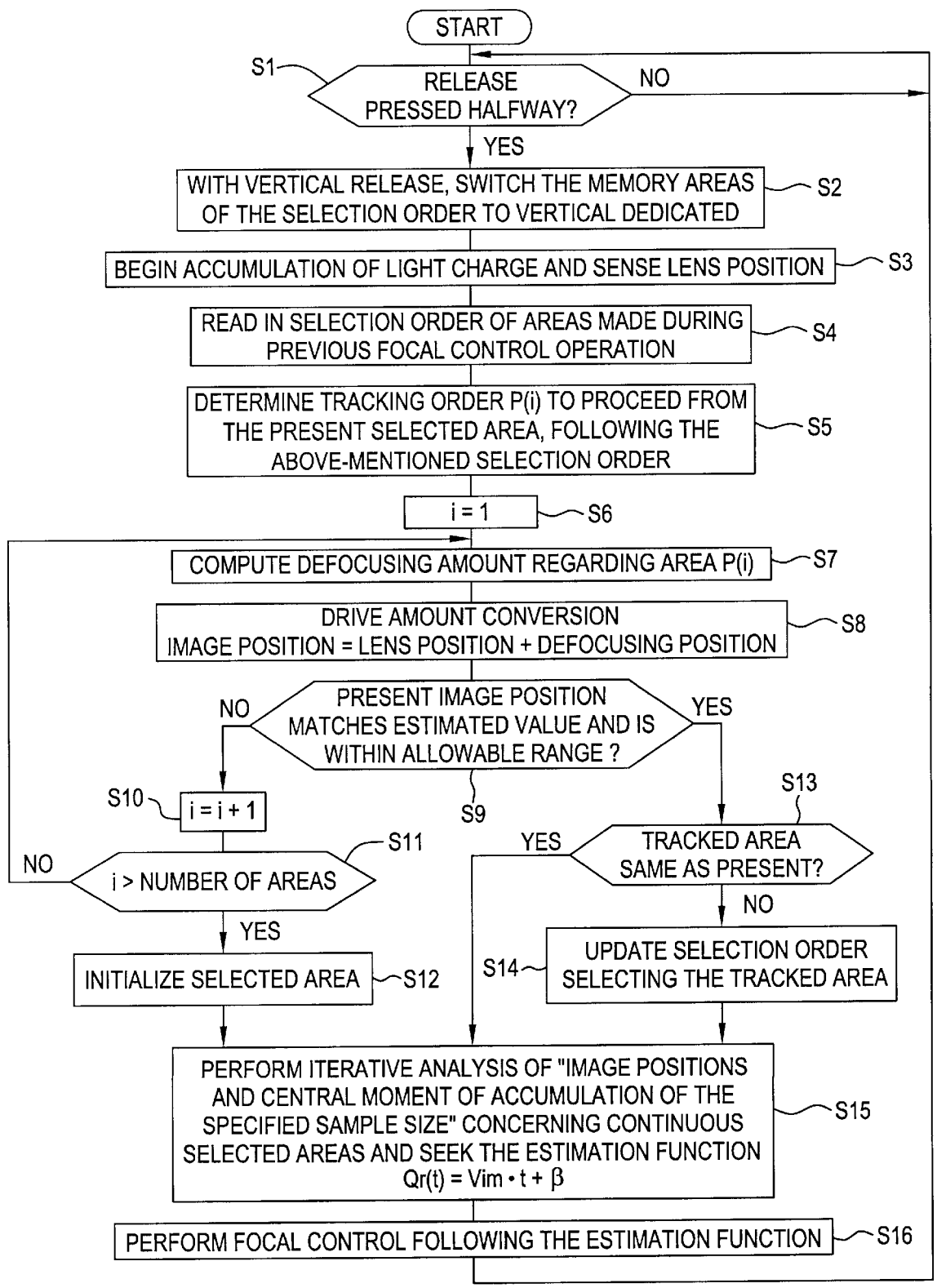
FIG. 6 is a flow chart explaining the operation of a first embodiment of the invention.

FIG. 6 is a flow chart explaining the operation of the first embodiment of the invention. The operation of the first embodiment is explained below referring to FIG. 6.

First, after the transmitted light of the photographic optical system 13 passes the transmitting component of the mirror 14, it is reflected by the submirror 15 and is formed near the light-blocking plate 53 within the focus detection component 16. The light-blocking plate 53 selectively blocks the light outside the focus detection areas (i.e., outside the field masks 53a–e). The light having passed through the light-blocking plate 53 in this manner reaches the diaphragm plate 57 via the condenser lens 52 and the mirror 55.

At the diaphragm plate 57, the light beam is divided into individual beams by the diaphragm masks 57a–e. The divided light beams are formed in individual fanlike images via the separator lenses 58a–e. Multiple pairs of light images are formed on the light-receiving plane of the image sensor 59.

When the release button is pressed halfway (Step S1 of FIG. 6), the microprocessor 18 determines which of the vertical and horizontal photography release buttons was pressed, and switches the memory areas in the selection order as described later (Step S2 of FIG. 6). Next, the microprocessor 18 executes the accumulation of light charge by controlling the image sensor 59. During the period of charge accumulation, the microprocessor 18 detects the lens position based on the pulse output of the encoder 21 (Step S3 of FIG. 6). The light-receivers 59a–e transfer the light charge in the order of the accumulation of the light charge, and output image signals to the microprocessor 18.

The microprocessor 18 determines as follows the tracking order P(i) of the focus detection areas. First, the microprocessor 18 reads out the selection order of the focus detection areas made during the previous focus control operation (Step S4 of FIG. 6). The microprocessor 18 follows this selection order, and determines the tracking order P(i) commencing from the present selected area (the initialized area during the first focus detection operation) (Step S5 of FIG. 6).

Figure 7:
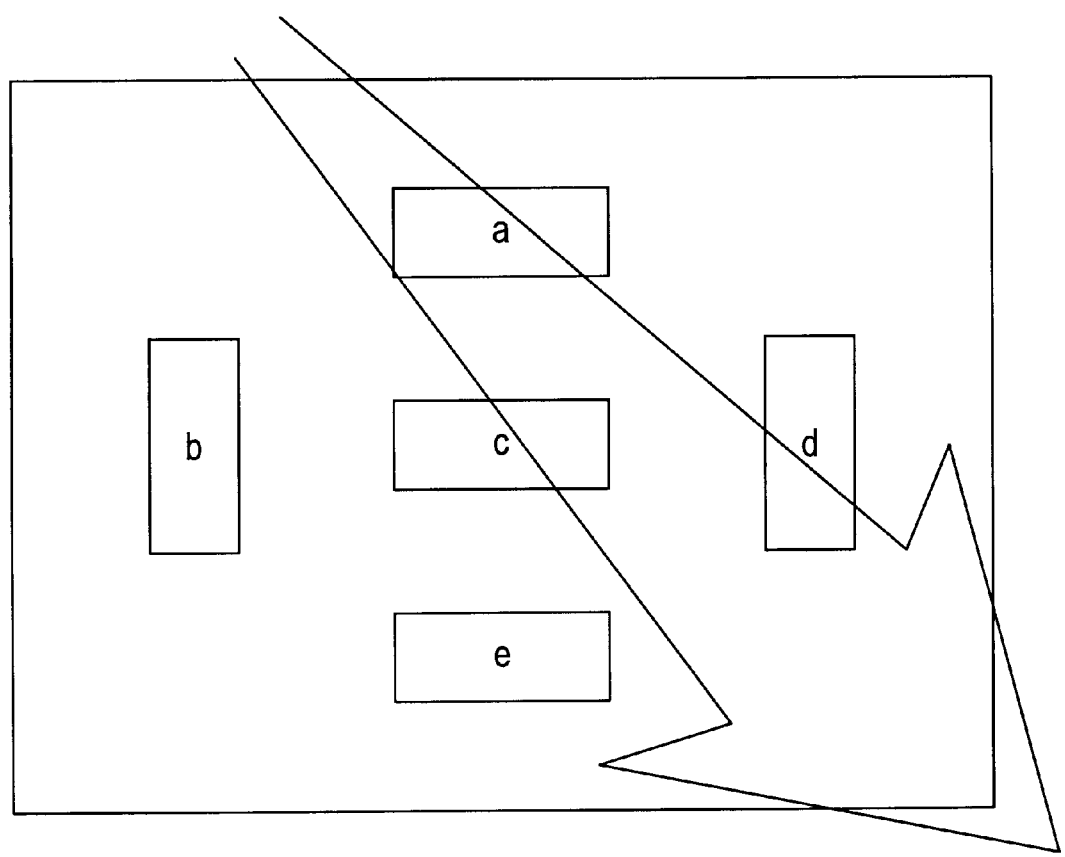
FIG. 7 is a drawing explaining object movement on the photographic screen.

For example, as shown in FIG. 7, when the object of the previous focus control operation passed the focus detection areas in the order of "a→c→d" and the present selected area is "a," the tracking order P(i) becomes:

P(1)=a

P(2)=c

P(3)=d

Regarding the rest of the tracking order, it may be determined randomly, or it may be set as follows:

P(4)=b

P(5)=e following a track parallel to the course of movement of the object as shown in FIG. 7. After the tracking order P(i) has been set, the microprocessor 18 initializes the variable i to 1 (Step S6 of FIG. 6), and begins tracking the focus detection areas.

First, the microprocessor 18 performs a well-known correlation computation regarding the focus detection area corresponding to the tracking order P(i), and detects the defocusing amount (Step S7 of FIG. 6). The image position is computed by adding the defocusing amount and the detected lens position (Step S8 of FIG. 6). The detected image position is the value corresponding to the image distance from the photographic optical system 13 to the object image, and it is the value that directly indicates the movement of the object in the forward and backward directions.

Figure 8:
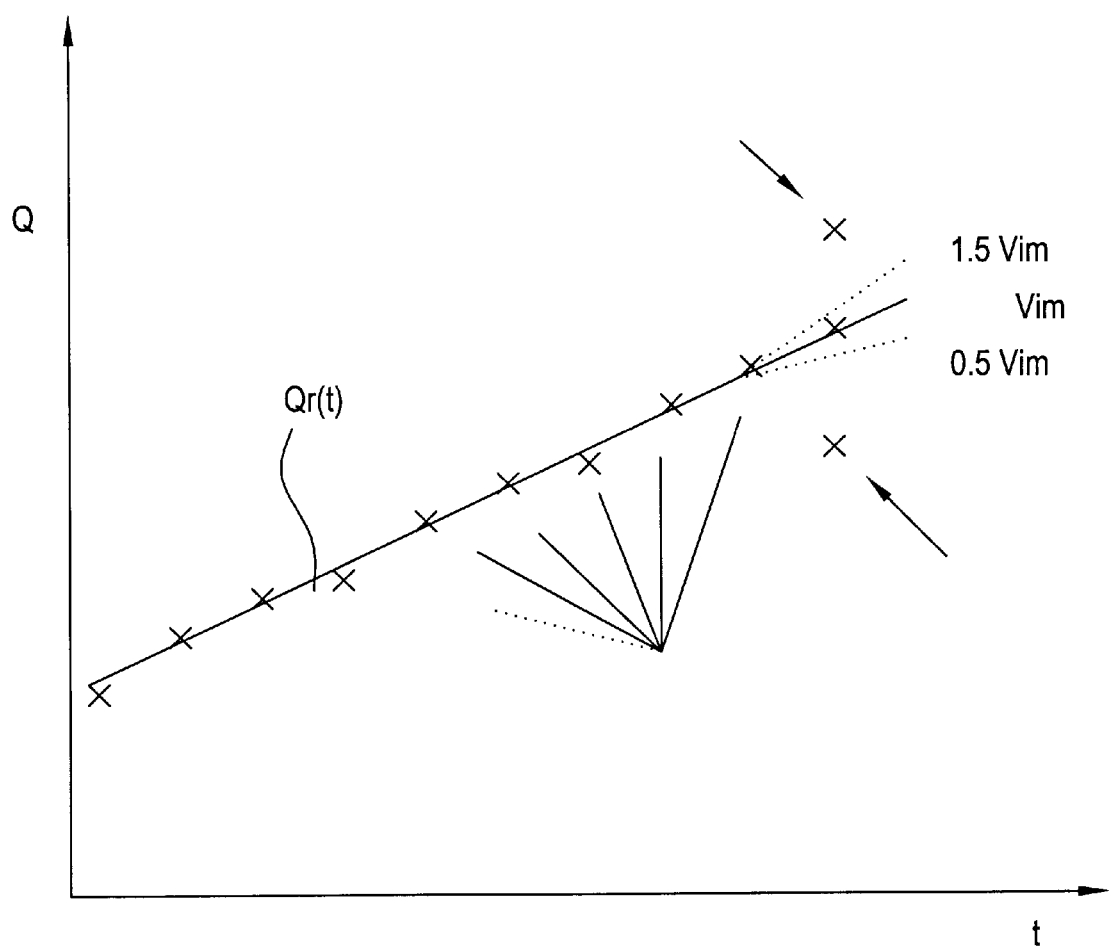
FIG. 8 is a graph explaining the tracking of the focus detection areas.

The microprocessor 18 determines the image velocity Vim based on the past image positions in the selected areas, and as shown in FIG. 8, determines whether the image position at the present time is inside the allowable range derived from "0.5~1.5 times the image velocity Vim" (Step S9 of FIG. 6). If the image position at the present time is not inside the allowable range, because there is no continuity of the image position, it is determined that the object being followed is not present within the focus detection area. Thus, the microprocessor 18 returns to step S7 of FIG. 6 after having advanced the variable i (Step S10 of FIG. 6), and repeats the above-mentioned determination regarding the next focus detection area indicated by the tracking order P(i).

When an applicable focus detection area cannot be found (Step S11 of FIG. 6) despite such tracking, it is determined that the object being tracked has moved out of the range of the photographic screen. Thus, the microprocessor 18 initializes the selected area and moves to the next focus control operation (Step S12 of FIG. 6).

On the other hand, if the image position is within the allowable range (Step S9 of FIG. 6), because the continuity of the image position is preserved, the possibility is high that the object image being followed is within that focus detection area. Thus, the microprocessor 18 sets the focus detection area indicated by the present P(i) as the selected area, and updates the selection order in the memory (Step S13 of FIG. 6).

Next, the microprocessor 18 performs iterative analysis regarding the "image positions and central moment of accumulation of the specified sample size" in a series of selected areas, and computes the latest estimation function Qr(t) (Step S15 of FIG. 6). If the data size does not satisfy the specified sample size, the microprocessor 18 performs the iterative analysis within the scope of the present data size. The microprocessor 18 drives the motor 19 according to this latest estimation function Qr(t), and executes focus adjustment (Step S16 of FIG. 6).

Because this embodiment tracks the direction of movement of the object image based on the past selection order, with objects which consistently follow a same or similar course of movement, it is possible to reduce efficiently the time needed for tracking. Also, because the tracking is performed preferentially beginning with the focus detection areas of highest probability, the risk of erroneously discriminating as the object a body other than the object is reduced. Thus, it is possible to track correctly the direction of movement of the object. Further, because memory areas are provided for each camera orientation as discussed later, it is possible to determine optimally the tracking order of the object image by considering the difference in the camera orientation.

Figure 9:
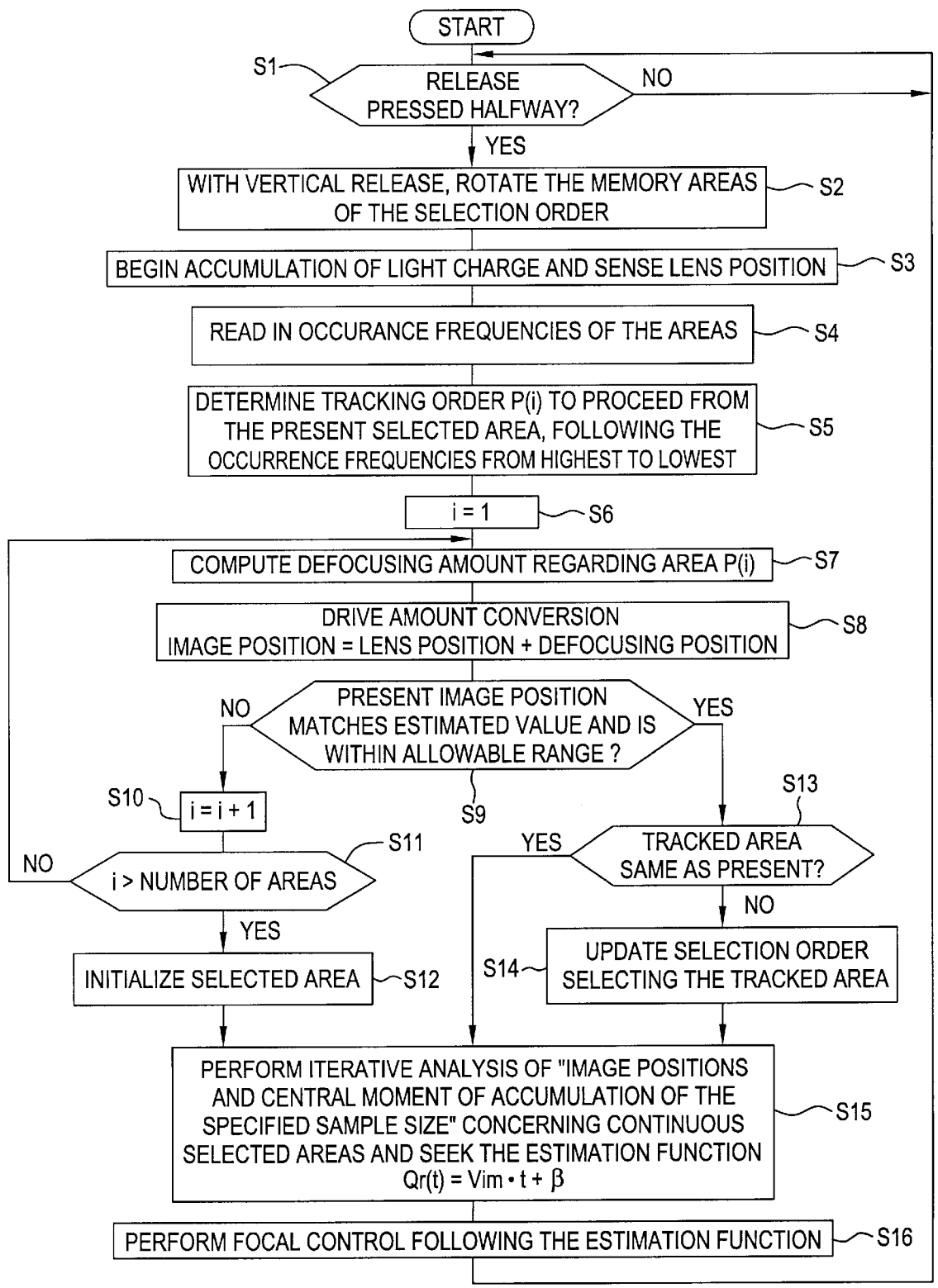
FIG. 9 is a flow chart explaining the operation of a second embodiment of the invention.

Next, the second embodiment is explained referring to FIG. 9, which is a flow chart explaining the operation of the second embodiment. Because the structure of the second embodiment is substantially identical to the structure of the first embodiment, except for the internal functions of the microprocessor 18, the explanation here is abridged.

Regarding the second embodiment also represented in the block diagram of FIG. 1, generally, the focus detector 1 corresponds to the focus detection component 16; the memory device 2 corresponds to the "occurrence frequency memory function" of the microprocessor 18; the focus estimation device 3 corresponds to the "image position estimation function" of the microprocessor 18; the tracking device 4 corresponds to the "object movement direction tracking function" of the microprocessor 18; and the focus controller 5 corresponds to the motor 19, the lens drive mechanism 20, the encoder 21, and the "focus control function" of the microprocessor 18. Further, generally, the camera orientation detector 6 corresponds to the horizontal photography release button 22, the vertical photography release button 23, and the "camera position determination function" of the microprocessor 18.

Figure 10A:
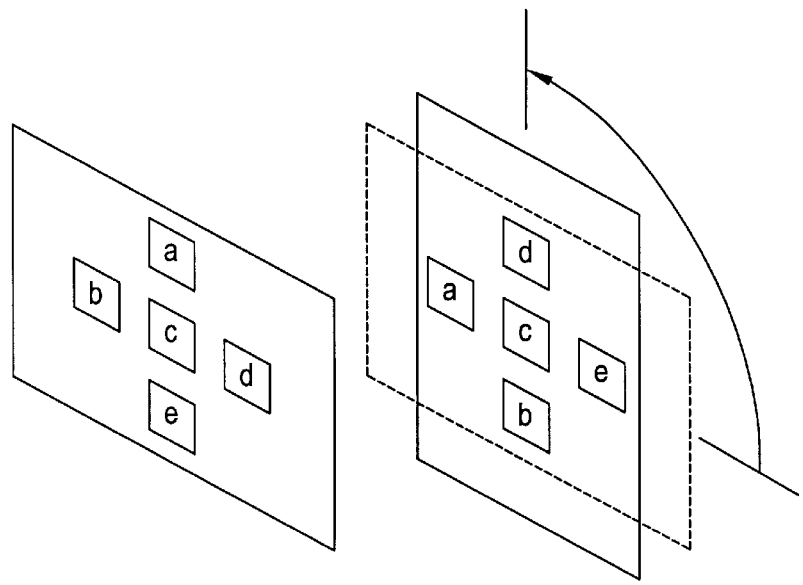
FIGS. 10(A) and 10(B) are drawings explaining the changing of the camera orientation.
Figure 10B:
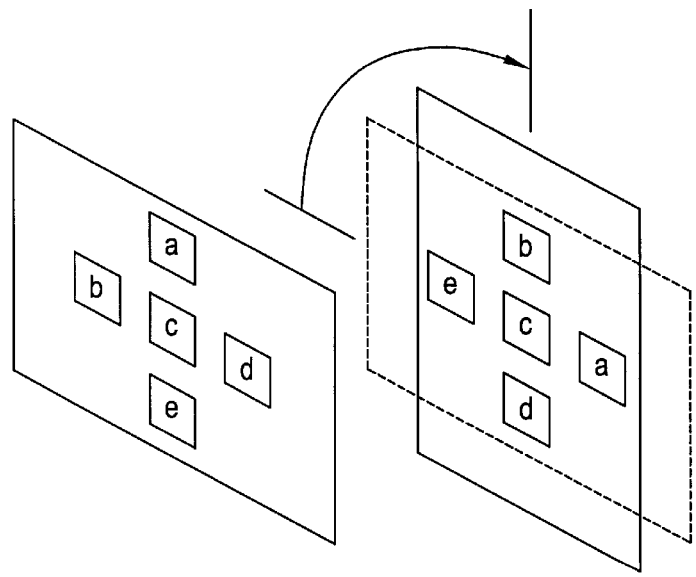

When the release of the camera is pressed halfway (Step S1 of FIG. 9), the microprocessor 18 determines whether the vertical photography or horizontal photography release button has been pressed, and adjusts the allocation of the memory areas (Step S2 of FIG. 9). That is, as shown in FIG. 10(A), if the camera body 11 has been rotated 90° counterclockwise, having previously been horizontally oriented, the microprocessor 18 switches the allocation of the memory areas, rotating 90° counterclockwise the positional relationships of the focus detection areas. FIGS. 11(A) and 11(B) are tables that show the adjustment of the memory areas following a change in camera orientation. FIG. 10(B) also shows a state in which the camera body 11 has been rotated 90° clockwise from the horizontal position. By distinguishing the one horizontal orientation and the two vertical orientations using, for example, a posture sensor, the memory areas may be switched according to the three orientations.

The microprocessor 18 executes accumulation of the light charge by controlling the image sensor 59. During the charge accumulation period, the microprocessor 18 detects the position of the lens by counting the number of pulses of the encoder 21 (Step S3 of FIG. 9). Next, the microprocessor 18 reads out the occurrence frequencies of the focus detection areas from the memory areas inside the processor (Step S4 of FIG. 9).

The microprocessor 18 determines the tracking order P(i) from which to commence from the present selected area (the initialized area during the first focus detection operation) by following the occurrence frequencies from highest to lowest (Step S5 of FIG. 9). The direction of movement of the object is tracked according to the tracking order P(i) (Steps S6–S12 of FIG. 9). The microprocessor 18 sets as the selected area the focus detection area tracked in this manner, and updates the occurrence frequency inside the memory areas (FIGS. 9–11). Focal adjustment is executed regarding the selected areas (Steps S15–S16 of FIG. 9).

By the operation explained above, because this embodiment tracks the direction of movement of the object image in the order of occurrence frequencies of the focus detection areas, it is possible to shorten efficiently the time needed for tracking. Also, because the tracking is performed preferentially starting with the focus detection area of highest probability, the risk of erroneously discriminating as the object a body other than the object is reduced, and it is possible to track correctly the direction of movement of the object. Also, because the contents of the memory areas are rotated, differences in the courses of movement due to changes in the camera orientation are taken into consideration, and it is possible to record uniformly the history of the courses of movement.

Figure 12:
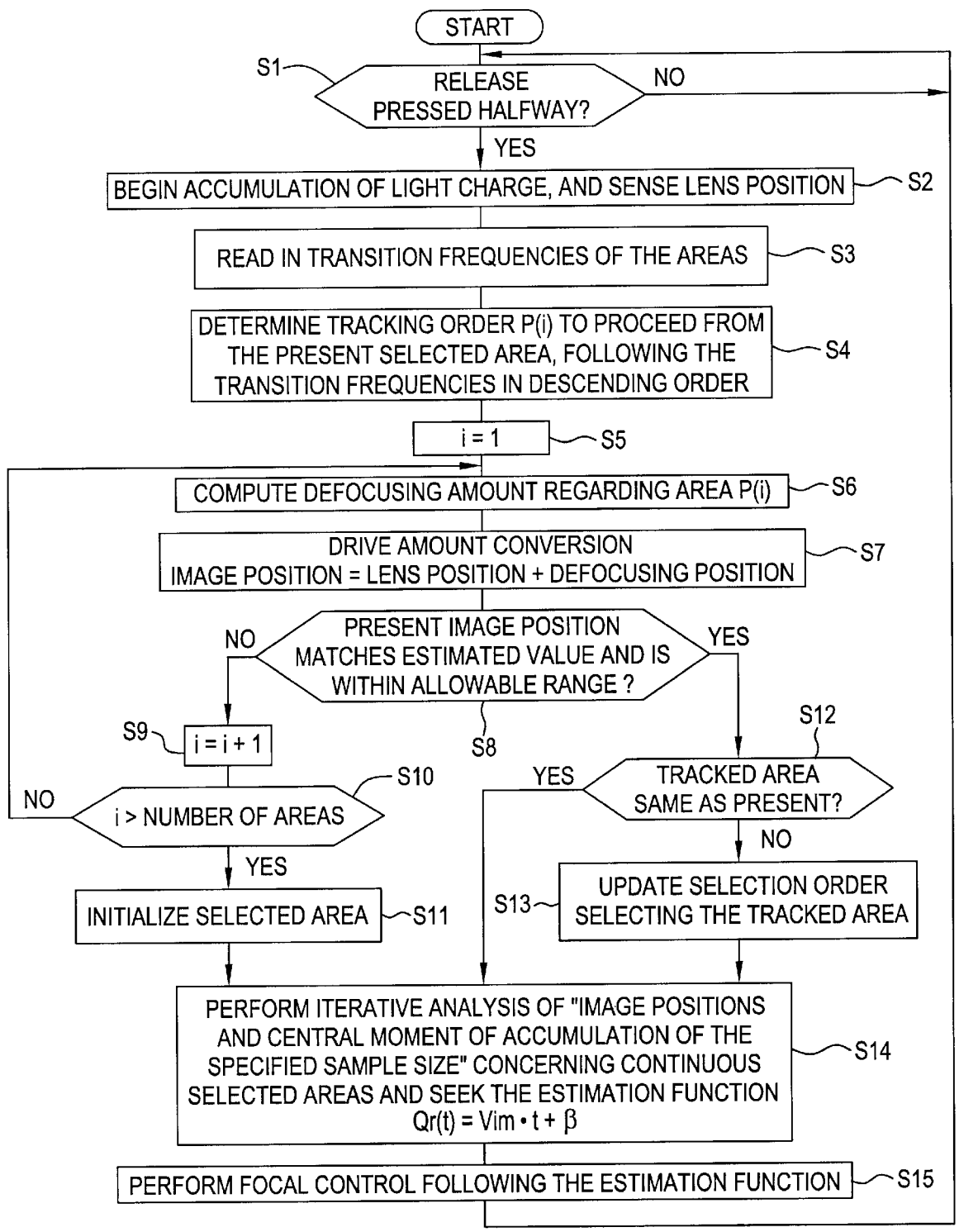
FIG. 12 is a flow chart showing the operation of a third embodiment of the invention.

Next, the third embodiment is explained referring to FIG. 12, which is a flow chart explaining the operation of the third embodiment. Because the structure of the third embodiment with the exclusion of the camera orientation detector is otherwise substantially identical to the structure of the first embodiment, except for the internal functions of the microprocessor 18, the explanation here is abridged.

Regarding the third embodiment represented in the block diagram of FIG. 2, generally, the focus detector 1 corresponds to the focus detection component 16; the memory device 2 corresponds to the "transition frequency memory function" of the microprocessor 18; the focus estimation device 3 corresponds to the "image position estimation function" of the microprocessor 18; the tracking device 4 corresponds to the "object movement direction tracking function" of the microprocessor 18; and the focus controller 5 corresponds to the motor 19, the lens drive mechanism 20, the encoder 21, and the "focus control function" of the microprocessor 18.

The third embodiment sets the tracking order P(i) following the order of highest to lowest transition frequency (Steps S3–S4 of FIG. 12). For example, if "a" is the present selected area as shown in FIG. 13, then the tracking order P(i) is set in the order of highest to lowest transition frequency from the focus detection area a:

P(1)=a
P(2)=c
P(3)=d
P(4)=b
P(5)=e

By using such a tracking order P(i), the third embodiment can efficiently shorten the time needed for tracking. Further, because the tracking is performed preferentially starting with the focus detection area of highest probability, the risk of erroneously discriminating as the object a body other than the object is low, and the reliability of the tracking results is dramatically improved.

Figure 14:
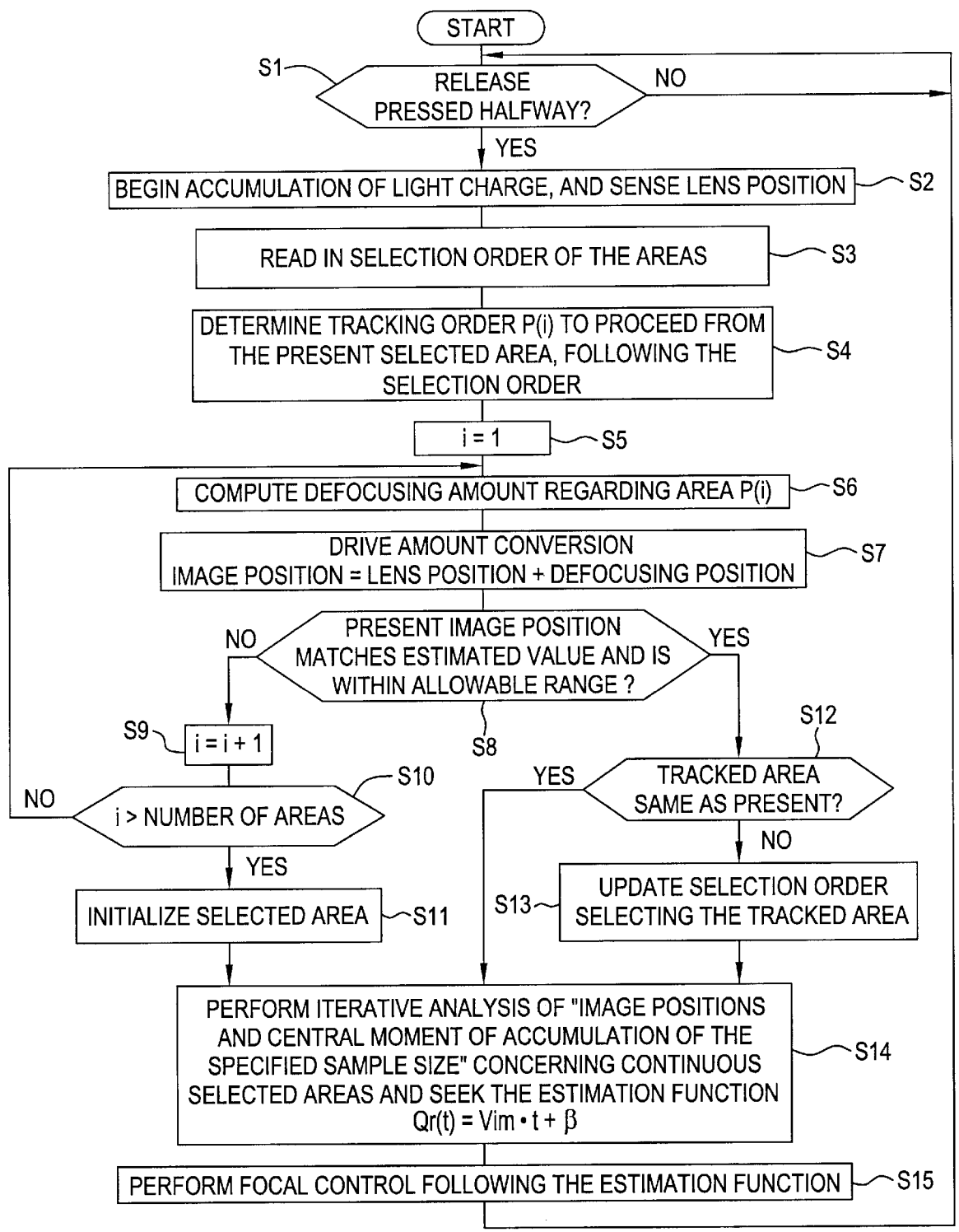
FIG. 14 is a flow chart showing the operation of a fourth embodiment of the invention.

Next, the fourth embodiment is explained referring to FIG. 14, which is a flow chart explaining the operation of the fourth embodiment. Because the structure of the fourth embodiment with the exclusion of the camera detector is otherwise substantially identical to the structure of the first embodiment, except for the internal function of the microprocessor 18, the explanation here is abridged.

Regarding the fourth embodiment also represented in the block diagram of FIG. 2, generally, the focus detector 1 corresponds to the focus detection component 16; the memory device 2 corresponds to the object course selection button 11a and the "setting order memory function" of the microprocessor 18; the focus estimation device 3 corresponds to the "image position estimation function" of the microprocessor 18; the tracking device 4d corresponds to the "object movement direction tracking function" of the microprocessor 18; and the focus controller 5 corresponds to the motor 19, the lens drive mechanism 20, the encoder 21, and the "focus control function" of the microprocessor 18.

The fourth embodiment sets the tracking order P(i) via the order selected by the photographer by means of the object course selection button 11a (Step S3–S4 of FIG. 14). For example, when the manually selected order is "a→c→d→e" and the present selected area is "c", then the tracking order P(i) is set to:

P(1)=c
P(2)=d
P(3)=e

Regarding the rest of the tracking order, it may be set, for example, by random. By the photographer determining suitably the setting order regarding objects whose course of movement can be estimated to a certain degree, it is possible to shorten efficiently the time needed for tracking. Also, because the tracking is performed in the order set by the photographer, the risk of erroneously discriminating as the object a body other than the object is low, and therefore the reliability of the tracking results is dramatically improved.

Figure 15:
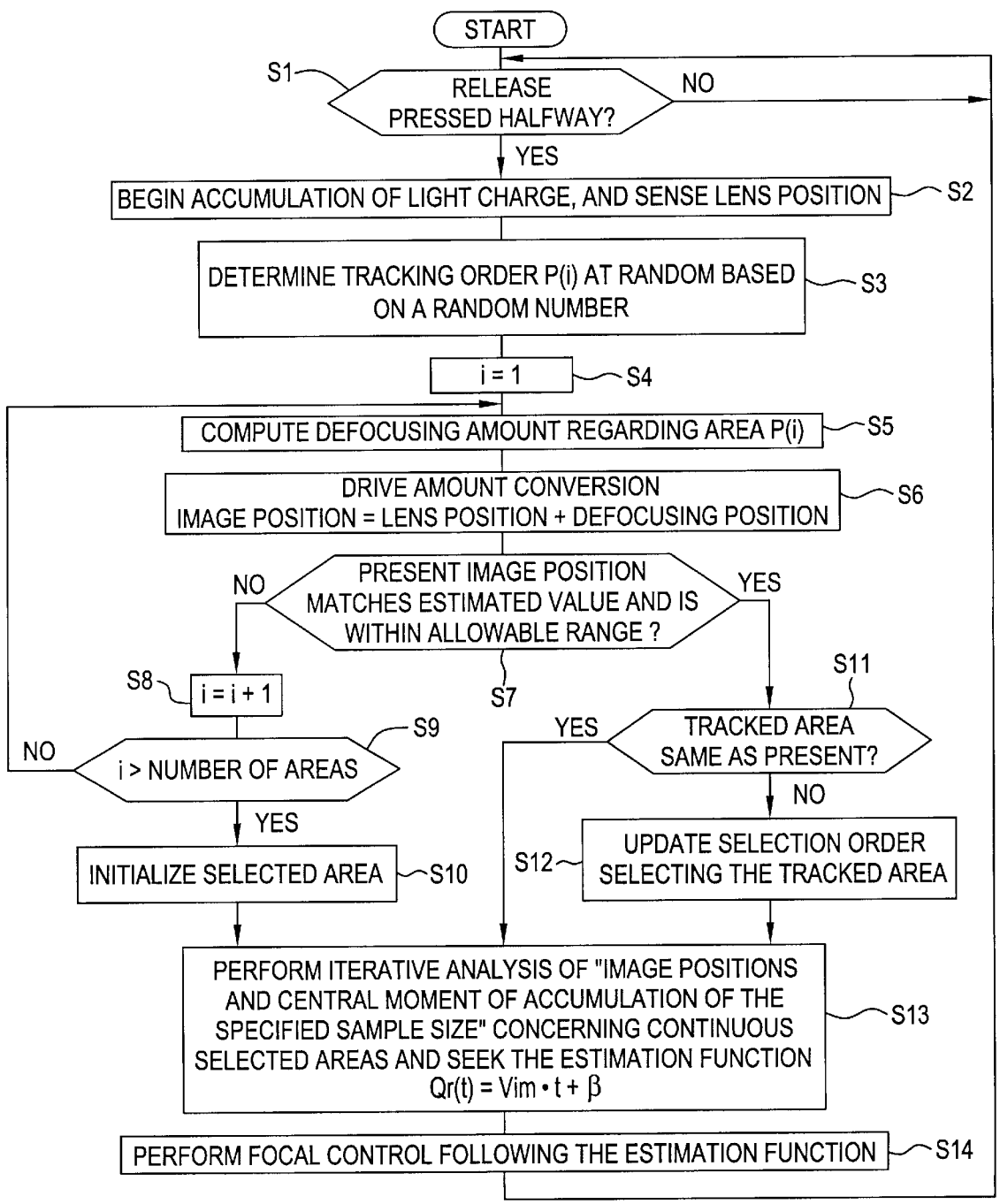
FIG. 15 is a flow chart showing the operation of a fifth embodiment of the invention.

Next, the fifth embodiment is explained referring FIG. 15, which is a flow chart explaining the operation of the fifth embodiment. Because the structure of the fifth embodiment with the exclusion of the camera orientation detector and memory is otherwise substantially identical to the structure of the first embodiment, except for the internal functions of the microprocessor 18, the explanation here is abridged.

Regarding the fifth embodiment represented in the block diagram of FIG. 3, generally, the focus detector 1 corresponds to the focus detection component 16; the focus estimation device 3 corresponds to the "image position estimation function" of the microprocessor 18; the tracking device 4 corresponds to the "object movement direction tracking function" of the microprocessor 18; and the focus controller 5 corresponds to the motor 19, the lens drive mechanism 20, the encoder 21, and the "focus control function" of the microprocessor 18.

The fifth embodiment sets the tracking order P(i) following a random order (Step S3 of FIG. 15). By using such a tracking order, the fifth embodiment can reduce the risk of the tracking time becoming indiscriminately longer with respect to objects for which the course of movement cannot be designated.

In the embodiments described above, the defocusing amount was used as the focus detection information. However, any value can be used as the focus detection information if it is a detected value or computed value expressing the focus status. For example, the range to the object, the position of the object image plane, the outside light passive image interval, the target drive position of the photographic optical system, and the outside light active light-receiving angle or light-receiving position may be used as the focus detection information. Further, the estimated value of the focus detection information is sought based on statistical estimation. However, the estimated value of the focus detection information may be sought other ways, for example, based on a 0-order hold, 1-order hold or other linear estimation.

In the first and second embodiments, the vertical orientation is detected by pressing the vertical photography release button 23. However, the camera orientation may be detected by providing the camera with an orientation sensor.

Also, in the second embodiment, the frequency of occurrence is recorded. However, a value corresponding to the frequency of occurrence may be recorded. For example, the probability of occurrence may be recorded. In the third embodiment, the frequency of transition is recorded. However, a value corresponding to the frequency of transition may be recorded. For example, the probability of transition may be recorded.

As explained above, the invention of the first embodiment tracks the direction of movement of the object image by following the past selection order. For example, objects that move on a fixed track such as automobiles and pedestrians on the road, consistently move on a same or similar course of movement. When photographing such an object, it is possible to shorten efficiently the time needed for tracking by tracking the direction of movement of the object image following the past selection order. Consequently, even when the object is moving at a high speed, it is possible to track it rapidly and to continue to focus without losing sight of the direction of movement. Also, because the tracking is performed preferentially starting with the focus detection areas of highest probability, the possibility of erroneously discriminating as the object a body other than the object is low, and therefore the reliability of the tracking is dramatically improved.

The invention according to the second embodiment tracks the direction of movement of the object image by following the past occurrence frequencies in order from highest to lowest. For example, for object images that move periodically following a fixed track, such as flowers waving in the wind and children riding on swings, the time during which the object is positioned at the ends of the periodic track is longest, and the occurrence frequencies of the focus detection areas corresponding to the two ends are higher.

When photographing objects that have many occurrences in designated locations, it is possible to dramatically shorten the time needed for tracking by tracking the direction of movement of the object image following the order of the past occurrence frequencies. Consequently, even when the object is moving at a high speed, it is possible to track it rapidly and to continue to focus without losing sight of the direction of movement. Also, because the tracking is performed preferentially starting with the focus detection areas of highest probability, the possibility of erroneously discriminating as the object a body other than the object is low, and therefore the reliability of the tracking is dramatically improved.

The invention according to the third embodiment tracks the direction of movement of the object image by following the past transition frequencies in order from highest to lowest. For example, objects that move on a fixed track such as automobiles and pedestrians on the road, consistently move on a same or similar course of movement. When photographing such an object, it is possible to shorten efficiently the time needed for tracking by tracking the direction of movement of the object image following the past selection order.

Thus, even when the object is moving at high speed, it is possible to track it rapidly and to continue to focus without losing sight of the direction of movement. Also, because the tracking is performed preferentially starting with the focus detection areas of highest probability, the possibility of erroneously discriminating as the object a body other than the object is low, and therefore the reliability of the tracking results is improved dramatically.

The invention according to the fourth embodiment tracks the direction of movement of the object image by following a manually selected tracking order. Generally, when photographing automobiles and pedestrians moving on the road, the object image generally follows a predictable course of movement. Therefore, for objects having a predictable course of movement, it is possible to efficiently shorten the time needed for tracking by determining the tracking order by following the order set by the photographer. Thus, the tracking time is significantly shortened, and it is possible to rapidly track object images moving at a high speed, and to continue to focus without losing sight of the direction of movement.

Also, because the tracking is performed following the order set by the photographer, the possibility of erroneously discriminating as the object a body other than the object is low, and therefore the reliability of the tracking is dramatically improved. Further, even for complex tracking orders to which automatic setting cannot respond, it is possible to respond flexibly by manual selection. consequently, it is possible to execute focus adjustment in a planned fashion by following the precise photographic intentions of the photographer.

With the invention according to the fifth embodiment, the direction of movement of the object image is tracked in a random order. Generally, when photographing children running around an open space, or when photographing butterflies fluttering about, it is difficult to specify the course of movement of the object image.

When setting indiscriminately the tracking order as conventionally regarding objects for which the course of movement is complex as such and cannot be specified, there is the risk that the tracking order will become indiscriminately long. Nevertheless, if the tracking order is changed each time at random, it is possible to reduce the risk of the tracking order becoming long. Consequently, it is possible to track at an average speed the movement of object images when it is difficult to specify the tracking order.

Further as discussed with respect to the first and second embodiments, the memory areas of the memory device can be switched according to the camera orientation. Therefore, it is possible to reflect correctly in the historical results of the memory device the changes of the course of movement due to changes in the camera orientation. Consequently, it becomes possible to determine more certainly the tracking order of the object images by considering the changes in camera orientation.

Further, it is possible to record uniformly the history of the course of movement by absorbing the differences of the course of movement in the camera orientation. Thus, it becomes possible to determine correctly the tracking order of the object images regardless of the changes in the camera orientation. Also, because it is possible to collect uniformly the history of the course of movement regarding the horizontal and vertical orientation, the sample size recorded in the memory is greater. Therefore, it becomes possible to determine more assuredly the tracking order of the object image. Additionally, while only the first and second embodiments are disclosed as including the camera orientation detector, the third and fourth embodiments may also be modified to include the camera orientation detector.

As explained above, it is possible to follow quickly and certainly an object image by adapting flexibly to the object conditions, and to continue to focus steadily. Consequently, the applicability of the focus adjustment apparatus is improved effectively, and it is possible to dramatically raise the performance of the focus adjustment operations.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus adjustment apparatus that tracks a direction of movement of an object from among a plurality of focus detection areas disposed within a photographic screen of a camera and continuously performs focus control regarding the tracked focus detection areas, the focus adjustment apparatus comprising:

a focus detector that individually detects focus detection information of said plurality of focus detection areas that are discretely arranged;

a focus estimation device that evaluates said focus detection information of a predetermined priority focus detection area among said plurality of focus detection areas;

a tracking device which, when appropriate focus detection information is obtained in said priority focus detection area, continues focus detection in that area based upon the evaluation result of said focus estimation device, and, when inappropriate focus detection information is obtained in said priority focus detection area, changes said priority focus detection area to another focus detection area according to a preselected order and searches for a focus detection area in which appropriate focus detection information can be obtained; and a focus controller that performs focus control in said focus detection area in which appropriate focus detection information can be obtained, which was searched by said tracking device.

2. The focus adjustment apparatus of claim 1, further comprising a memory device that records information relating to the tracked focus detection areas used in said focus control.

3. The focus adjustment apparatus of claim 2, wherein the information recorded by the memory device includes a selection order of focus detection areas used in said focus control during a previous focus control operation and said preselected order is the selection order recorded by said memory device.

4. The focus adjustment apparatus of claim 2, wherein the information recorded by the memory device includes frequencies of occurrence of focus detection areas used in said focus control during previous focus control operations and said preselected order is a highest to lowest order of the frequencies of occurrence recorded by said memory device.

5. The focus adjustment apparatus of claim 2, wherein the information recorded by the memory device includes frequencies of transition of focus detection areas used in said focus control during previous focus control operations and said preselected order is a highest to lowest order of the frequencies of transition recorded by said memory device.

6. The focus adjustment apparatus of claim 2, wherein the information recorded by the memory device includes an order of settings of focus detection areas selected by manual operation and said preselected order is the order of settings recorded by said memory device.

7. The focus adjustment apparatus of claim 1, wherein the preselected order is a randomly selected tracking order.

8. The focus adjustment apparatus of claim 3, further comprising:
a camera orientation detector that detects whether the camera is in a horizontal or a vertical orientation, wherein memory areas of said memory device are provided specifically for each of said orientations and are switched according to the orientation detected by said camera orientation detector.

9. The focus adjustment apparatus of claim 4, further comprising:
a camera orientation detector that detects whether the camera is in a horizontal or a vertical orientation, wherein memory areas of said memory device are provided specifically for each of said orientations and are switched according to the orientation detected by said camera orientation detector.

10. The focus adjustment apparatus of claim 5, further comprising:
a camera orientation detector that detects whether the camera is in a horizontal or a vertical orientation, wherein memory areas of said memory device are provided specifically for each of said orientations and are switched according to the orientation detected by said camera orientation detector.

11. The focus adjustment apparatus of claim 6, further comprising:
a camera orientation detector that detects whether the camera is in a horizontal or a vertical orientation, wherein memory areas of said memory device are provided specifically for each of said orientations and are switched according to the orientation detected by said camera orientation detector.

12. The focus adjustment apparatus of claim 3, further comprising:
a camera orientation detector that detects whether the camera is in a horizontal or a vertical orientation, wherein said memory device rotates positions of the focus detection areas in specific memory areas of said memory device according to the orientation detected by said camera orientation detector.

13. The focus adjustment apparatus of claim 4, further comprising:
a camera orientation detector that detects whether the camera is in a horizontal or a vertical orientation, wherein said memory device rotates positions of the focus detection areas in specific memory areas of said memory device according to the orientation detected by said camera orientation detector.

14. The focus adjustment apparatus of claim 5, further comprising:
a camera orientation detector that detects whether the camera is in a horizontal or a vertical orientation, wherein said memory device rotates positions of the focus detection areas in specific memory areas of said memory device according to the orientation detected by said camera orientation detector.

15. The focus adjustment apparatus of claim 6, further comprising:
a camera orientation detector that detects whether the camera is in a horizontal or a vertical orientation, wherein said memory device rotates positions of the focus detection areas in specific memory areas of said memory device according to the orientation detected by said camera orientation detector.

16. A focus adjustment apparatus that tracks a direction of movement of an object from among a plurality of focus detection areas disposed within a photographic screen of a camera and continuously performs focus control regarding the tracked focus detection areas, the focus adjustment apparatus comprising:
focus detection means for individually detecting focus detection information of said plurality of focus detection areas that are discretely arranged;
focus estimation means for evaluating said focus detection information of a predetermined priority focus detection area among said plurality of focus detection areas;
tracking means for, when appropriate focus detection information is obtained in said priority focus detection area, continuing focus detection in that area based upon the evaluation result of said focus estimation means, and, when inappropriate focus detection information is obtained in said priority focus detection area, changing said priority focus detection area to another focus detection area according to a preselected order and searching for a focus detection area in which appropriate focus detection information can be obtained; and
focus control means for performing focus control in said focus detection area in which appropriate focus detection information can be obtained, which was searched by said tracking means.

17. The focus adjustment apparatus of claim 16, further comprising memory means for recording information relating to the tracked focus detection areas used in said focus control.

18. A method for use in a focus adjustment apparatus that tracks a direction of movement of an object from among a plurality of focus detection areas disposed within a photographic screen of a camera and continuously performs focus control regarding the tracked focus detection areas, the focus adjustment apparatus comprising:
individually detecting focus detection information of said plurality of focus detection areas that are discretely arranged;

evaluating said focus detection information of a predetermined priority focus detection area among said plurality of focus detection areas;

based on said evaluating, when appropriate focus detection information is obtained in said priority focus detection area, continuing said focus detection in that area, and when inappropriate focus detection information is obtained in said priority focus detection area, changing said priority focus detection area to another focus detection area according to a preselected order and searching for a focus detection area in which appropriate focus detection information can be obtained; and performing focus control in said focus detection area in which appropriate focus detection information can be obtained, which was searched.

* * * * *